April 11, 1961  J. A. SIRONS  2,979,608
LIGHT WEIGHT CRASH LOCATOR BEACON
Filed March 7, 1960  10 Sheets-Sheet 1
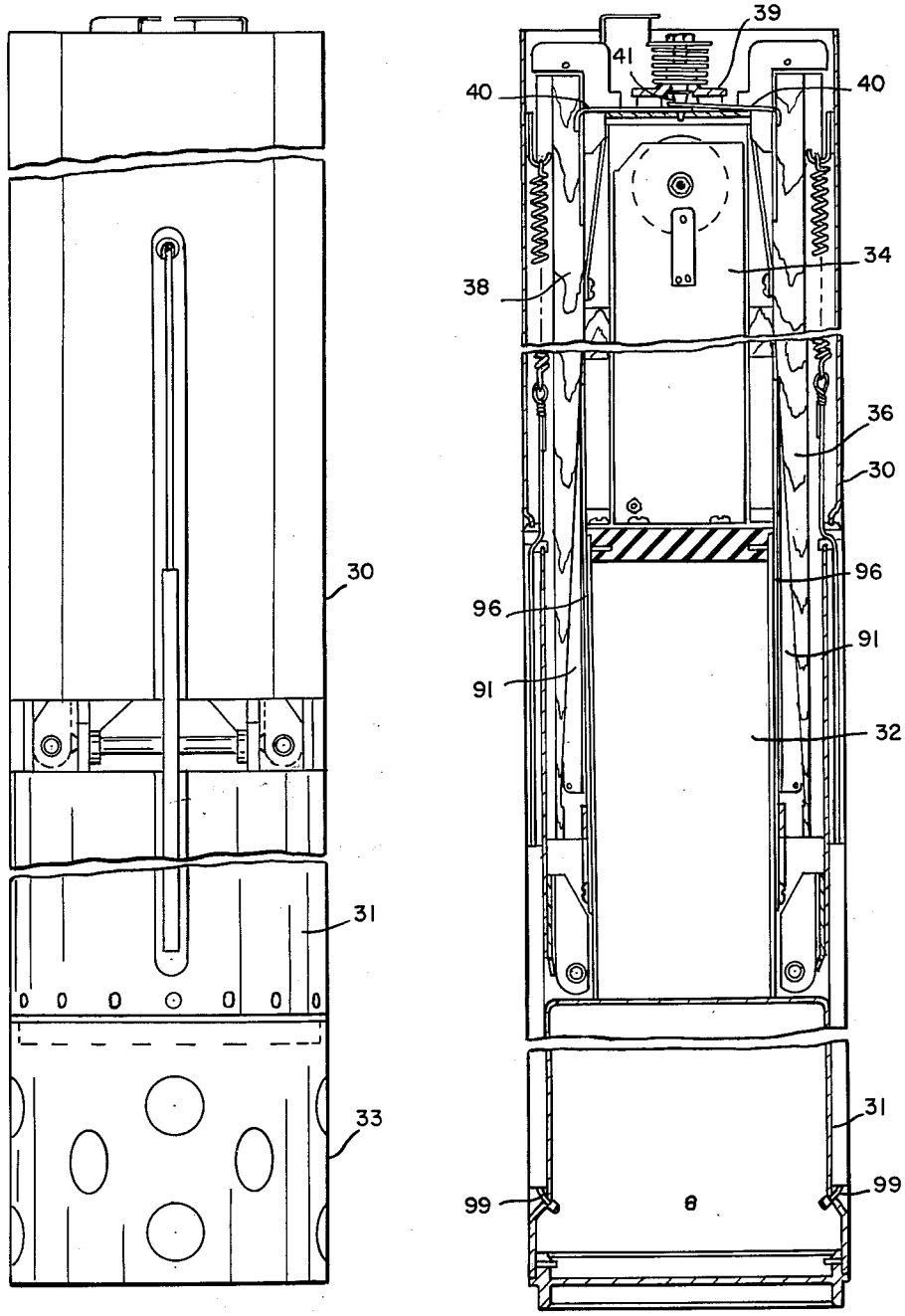

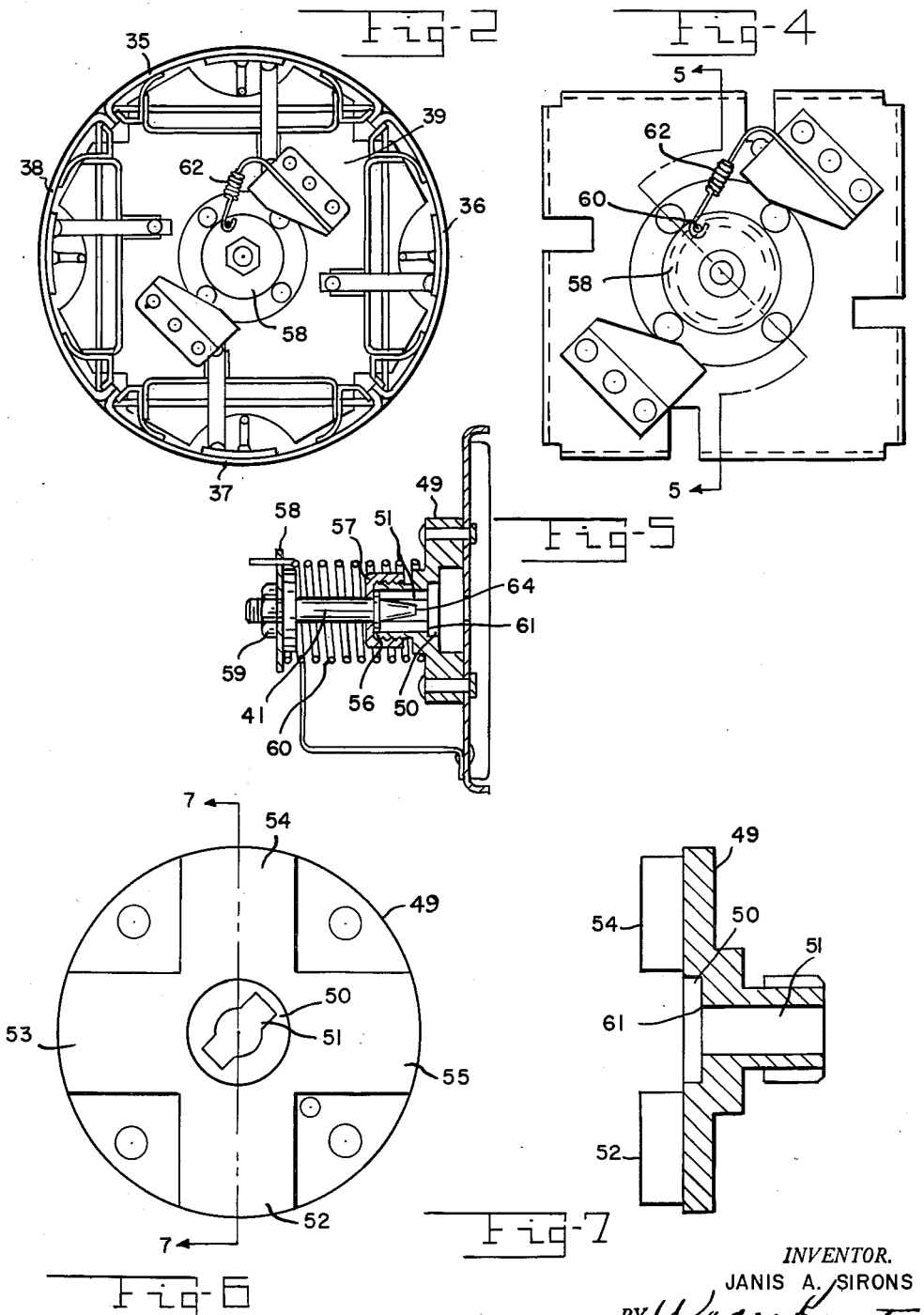

April 11, 1961 J. A. SIRONS 2,979,608
LIGHT WEIGHT CRASH LOCATOR BEACON
Filed March 7, 1960 10 Sheets-Sheet 3

*INVENTOR.*
JANIS A. SIRONS
BY
ATTORNEY

AGENT

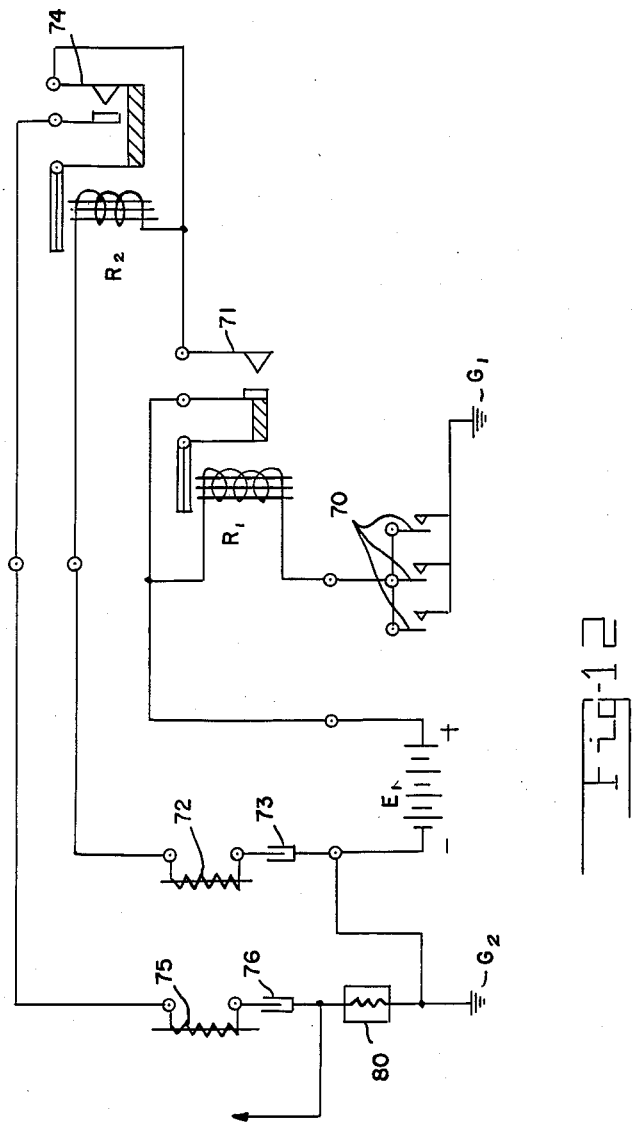

April 11, 1961 J. A. SIRONS 2,979,608
LIGHT WEIGHT CRASH LOCATOR BEACON
Filed March 7, 1960 10 Sheets-Sheet 5
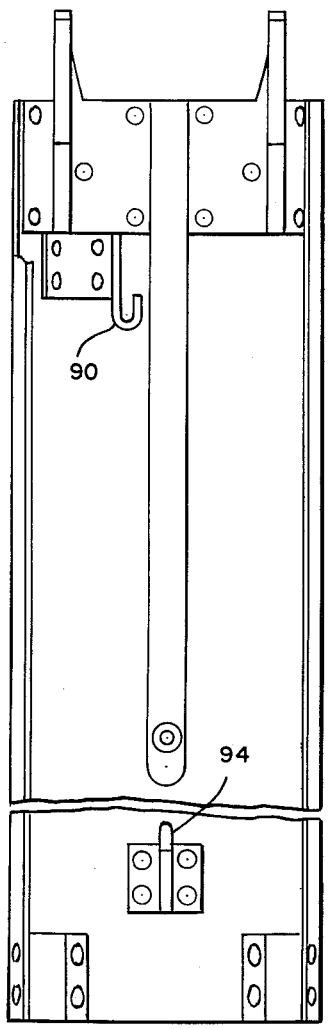
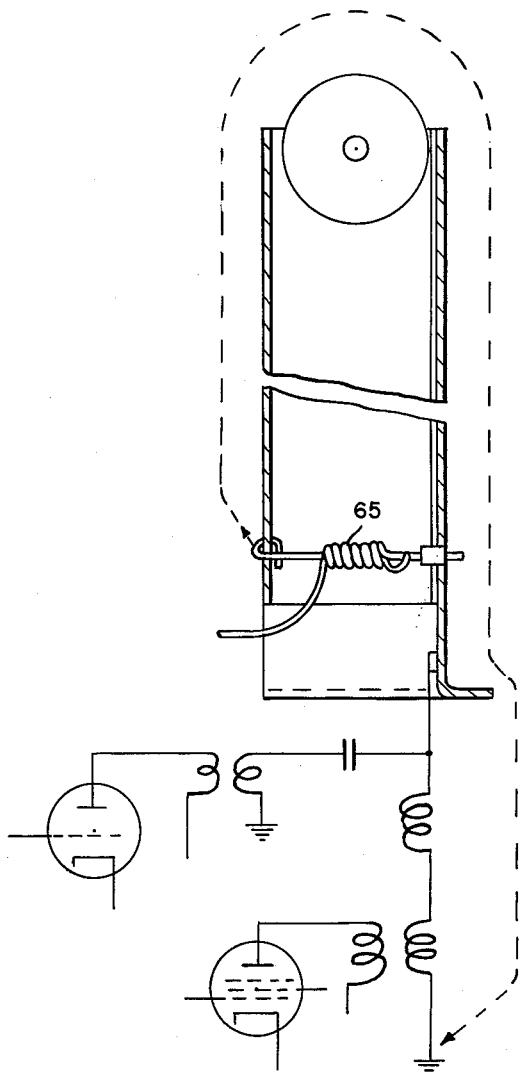
*INVENTOR.*
JANIS A. SIRONS
BY
ATTORNEY
AGENT

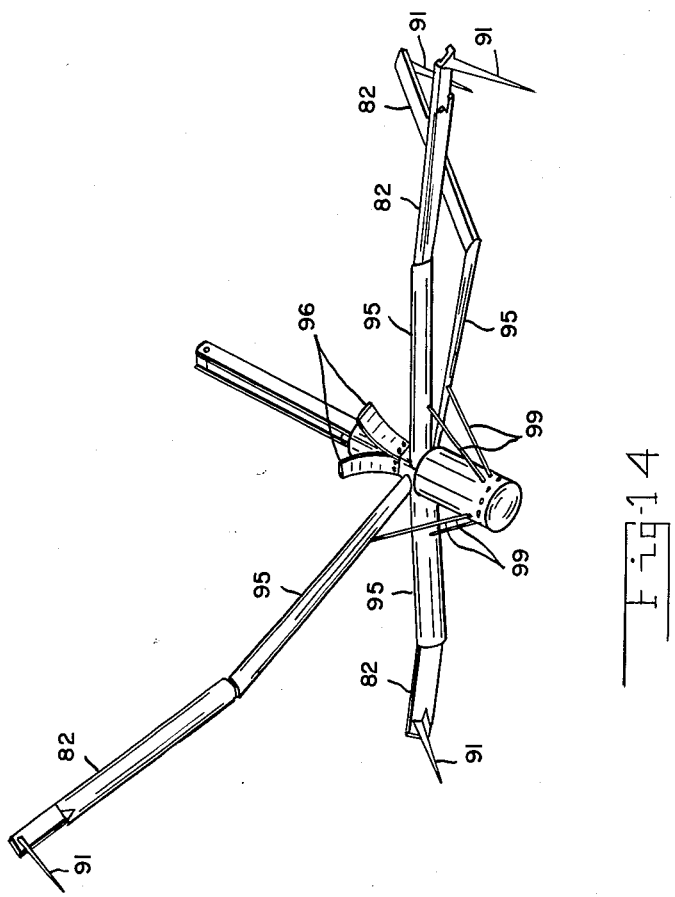

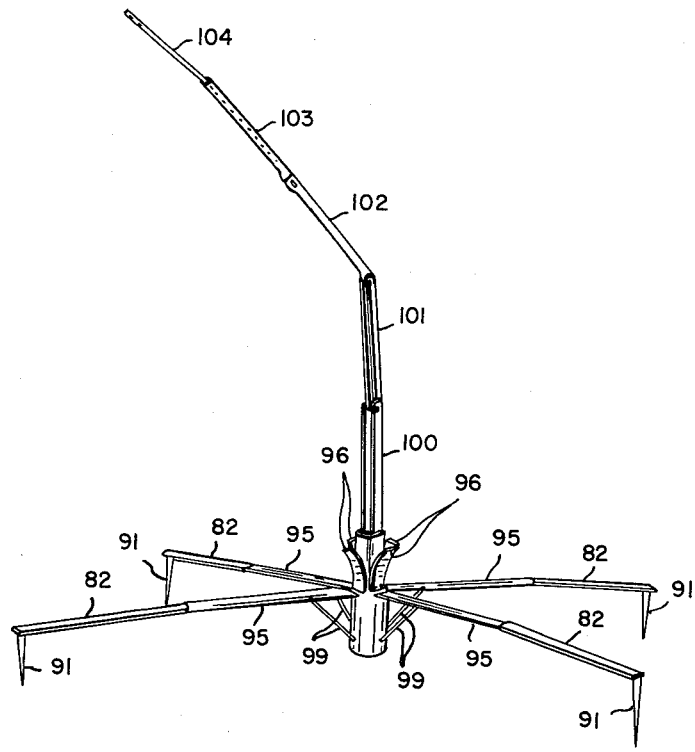

April 11, 1961 J. A. SIRONS 2,979,608
LIGHT WEIGHT CRASH LOCATOR BEACON
Filed March 7, 1960 10 Sheets-Sheet 8

INVENTOR.
JANIS A. SIRONS
BY
ATTORNEY
AGENT

April 11, 1961  J. A. SIRONS  2,979,608
LIGHT WEIGHT CRASH LOCATOR BEACON
Filed March 7, 1960  10 Sheets-Sheet 9

INVENTOR.
JANIS A. SIRONS
BY
ATTORNEY
AGENT

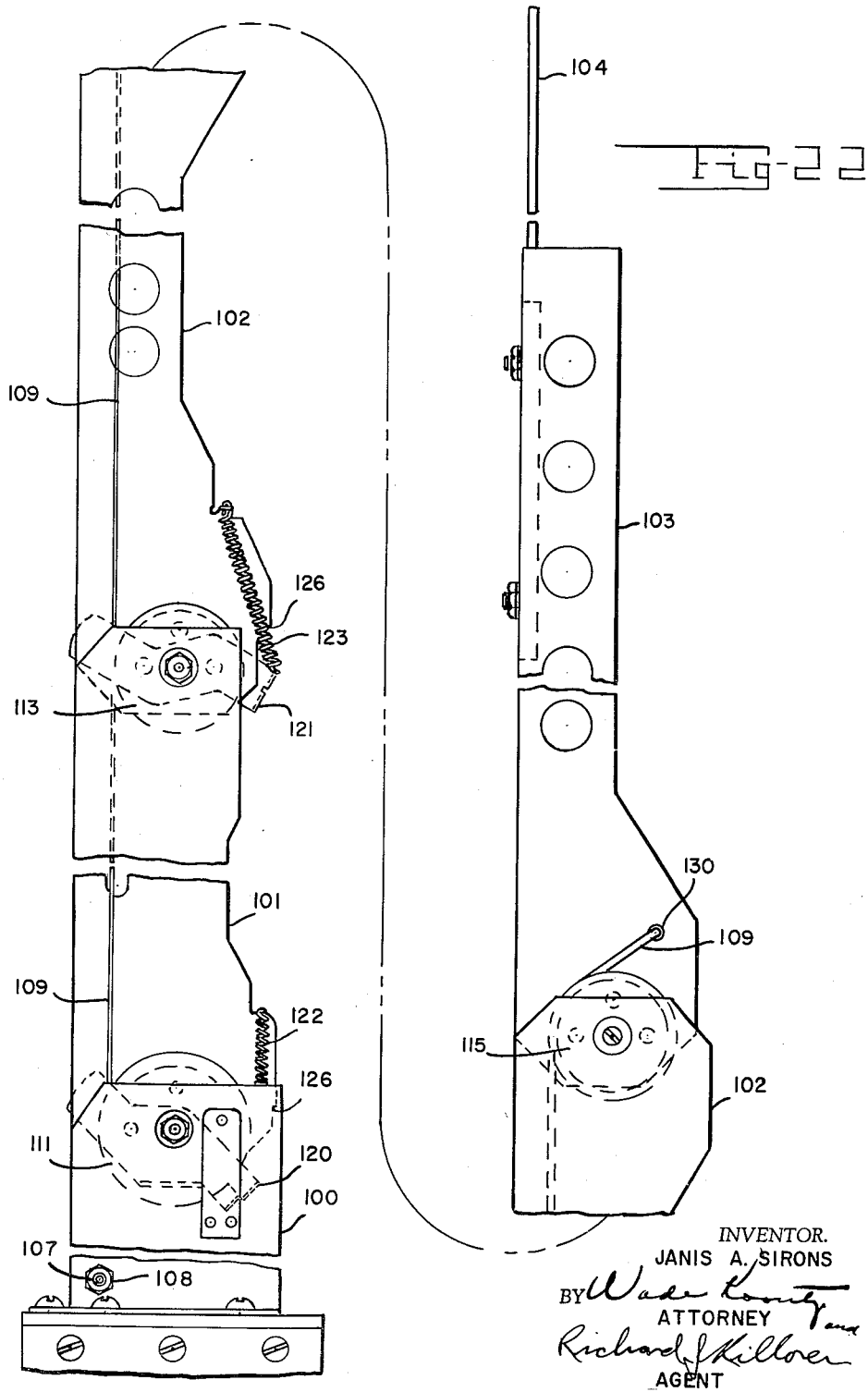

United States Patent Office 2,979,608
Patented Apr. 11, 1961

2,979,608

LIGHT WEIGHT CRASH LOCATOR BEACON

Janis Alfreds Sirons, Springfield, Ohio, assignor to the United States of America as represented by the Secretary of the Air Force Filed Mar. 7, 1960, Ser. No. 13,402

8 Claims. (Cl. 250—17)

(Granted under Title 35, U.S. Code (1952), sec. 266)

The invention described herein may be manufactured and used by or for the United States Government for governmental purposes without payment to me of any royalty thereon.

This invention relates to a light weight crash locator beacon.

One object of the invention is to provide a crash locator beacon which is light, but rugged in construction and which has good reliability and simplicity of operation.

Another object is to provide a crash locator beacon which provides a proper ground plane for R.F. propagation.

These and other objects will be more fully understood from the following detailed description taken with the drawing, wherein:

Fig. 1 is a contracted view of an antenna according to the invention in its folded condition;

Fig. 2 is a top view of the antenna of Fig. 1;

Fig. 3 is a view partially in section of the device of Fig. 1;

Fig. 4 is a top view of the leg release mechanism for the device of Figs. 1 and 3;

Fig. 5 is a sectional view along the lines 5—5 of Fig. 4;

Fig. 6 is a bottom view of the body member of the leg release mechanism;

Fig. 7 is a sectional view along the lines 7—7 of Fig. 6;

Fig. 12 shows a circuit for operating the leg release mechanism;

Fig. 13 shows antenna network for the radio beacon and the antenna release;

Fig. 14 is a view in perspective of the crash locator beacon with the legs partially extended;

Fig. 15 is a view in perspective of the crash locator beacon with the antenna partially extended;

Fig. 16 is a view, partially in section, of one leg assembly;

Fig. 17 is a top view of the outer leg;

Fig. 18 is an end view of the outer leg of Fig. 17;

Fig. 22 is a contracted side view of the antenna.

Figure 8:
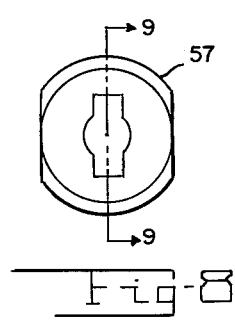
Fig. 8 is a top view of the nut cap for the leg release mechanism.
Figure 9:
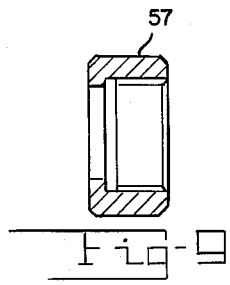
Fig. 9 is a sectional view along the lines 9—9 of Fig. 8.
Figure 10:
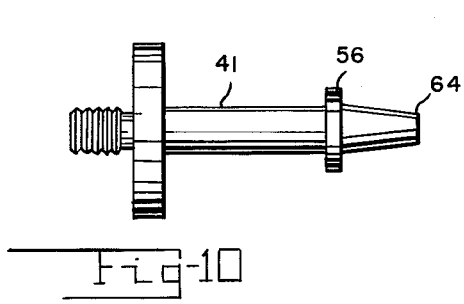
Fig. 10 is a side view of the plunger element for the leg release mechanism.
Figure 11:
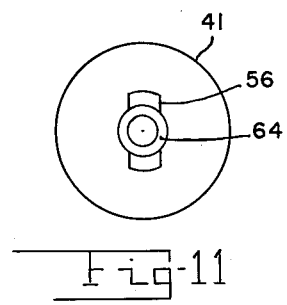
Fig. 11 is a bottom view of the plunger element mechanism of Fig. 10.

A need was found to exist for a device which will automatically inform rescue facilities of the existence of an aircraft crash and provide a signal suitable for fixing the position of the crash through ground automatic direction finding networks and for locating the crash area through air-borne UHF homing.

The crash locator beacon of this invention provides a HF signal to be used in conjunction with ground direction finding equipment and a UHF signal to be used with air-borne UHF homing equipment. The particular means used to provide these signals do not constitute a part of this invention. The device of this invention is to be used with an ejection system which automatically ejects the beacon from the aircraft upon impact with any obstacle or at the discretion of the pilot. The beacon is parachuted to ground and the parachute is released by means which do not constitute a part of this invention.

Upon impact with the ground, releases are operated which release the legs and the antenna to erect the beacon so that the transmitters may be set into operation.

Referring more particularly to Figs. 1 and 3 of the drawing, reference character 30 refers to the crash locator beacon having a battery housing 31 and a transmitter housing 32, shock absorber 33, an antenna 34, shown in its folded condition. Four legs for the beacon, 35, 36, 37 and 38 shown in Fig. 2, are folded alongside of the antenna element and secured by means of a leg release mechanism 39 as shown in Figs. 2 and 3. The legs are retained in position by means of leg retaining elements 40, which have openings through which plunger 41 of the leg release mechanism passes to thereby retain the legs alongside the antenna element 34. The legs are released when pin 41 is removed from the openings in leg retaining elements 40.

The leg release mechanism consists of two parts. A fusible release 62, which will be explained in more detail in connection with Fig. 12 and a mechanical release shown in Figs. 5 through 11.

The body member 49 of the leg release mechanism has a recessed circular portion 50, a key slot 51 and four channels, 52, 53, 54 and 55 for receiving the leg retaining elements 40. The key slot opening 51 has substantially the same shape as flange member 56 on plunger 41, shown in Fig. 11. A nut cap 57, having a slot similar to that in body member 49, is threaded onto body member 49. The opening in nut cap 57 is for the purpose of inserting the plunger 40 during assembly of the leg release mechanism. The longest dimension of the opening in the nut cap must be angularly displaced from the longest dimension of the opening in the body member when the plunger is in its retracted position so that the plunger will not fly free of the leg release mechanism when the release is operated. A plate member 58 is secured to the plunger 41 by means of a nut 59. Plate member 58 and body member 49 have holes therein for receiving projections from a spring 60. When the release mechanism is set, the plunger member is pushed through opening 51 and turned so that the flange member 56 is retained by shoulder 61. The spring is then retained in this position by means of fusible release member 62, the operation of which will be explained in connection with Fig. 12. In its set position, projection 64 on the plunger passes through the opening in leg retaining members 40. When fusible release member 62 is disconnected the plate member 58 is caused to rotate together with plunger 41 by the action of spring 60 until the flange 56 is aligned with the opening 51 in body member 49. The plunger then moves back to the position shown in Fig. 5 and the legs are released.

The circuit for operating the fusible release element 62 is shown in Fig. 12. When the beacon falls on the ground and shock absorber 33 is damaged, the contacts 70 are closed. Current then flows from ground $G_1$ through contacts 70, relay $R_1$, battery $E_1$ and back to ground $G_2$. Relay $R_1$ is then actuated and closes contacts 71. Current then flows through the circuit from the battery $E_1$ through contacts 71, relay $R_2$, leg release heater winding 72, fusible release 73 and back to the negative terminal of the battery. The current flowing through heater winding 72, which is wound around fusible release 73 to make up the fusible release member 62 in Fig. 2, causes the fusible release to operate in about 6 to 8 seconds. Contacts 74 on relay $R_2$ open when current flows through $R_2$ thus keeping current from flowing through the antenna heater winding 75 and fusible release 76. When fusible release 73 releases, the circuit is broken through relay $R_2$ and this closes the circuit through the antenna heater winding 75 of antenna release 65 shown in Fig. 13. Current then flows from the battery $E_1$ through contacts 71, contacts 74, antenna release heater winding 75, fusible release 76 and back to the negative terminal of voltage supply $E_1$ through the antenna network 80. After another 6 to 8 seconds, the antenna fusible release operates to release the antenna as shown in Fig. 13. Separation of the fusible release 76 also stops current flow through the last recited circuit so that during operation of the beacon the transmitter power supply $E_1$ is disconnected from the antenna network.

The legs 35, 36, 37 and 38 are all the same, therefore only one will be described in detail with reference to Fig. 16.

Figure 19:
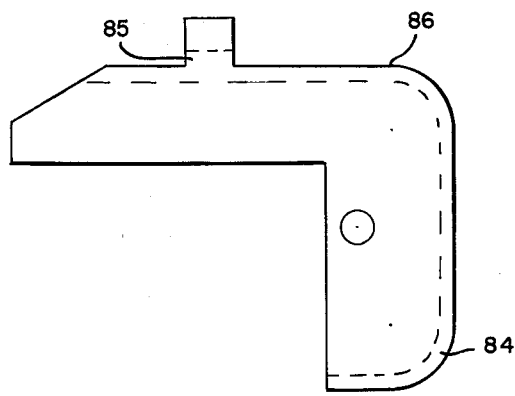
Fig. 19 shows a side view of a leg cable guide member.
Figure 20:
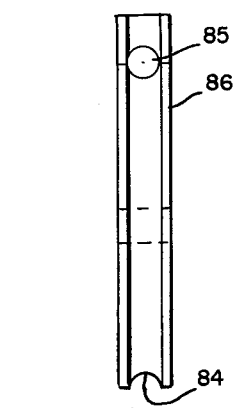
Fig. 20 shows an end view of the guide member of Fig. 19.
Figure 10:
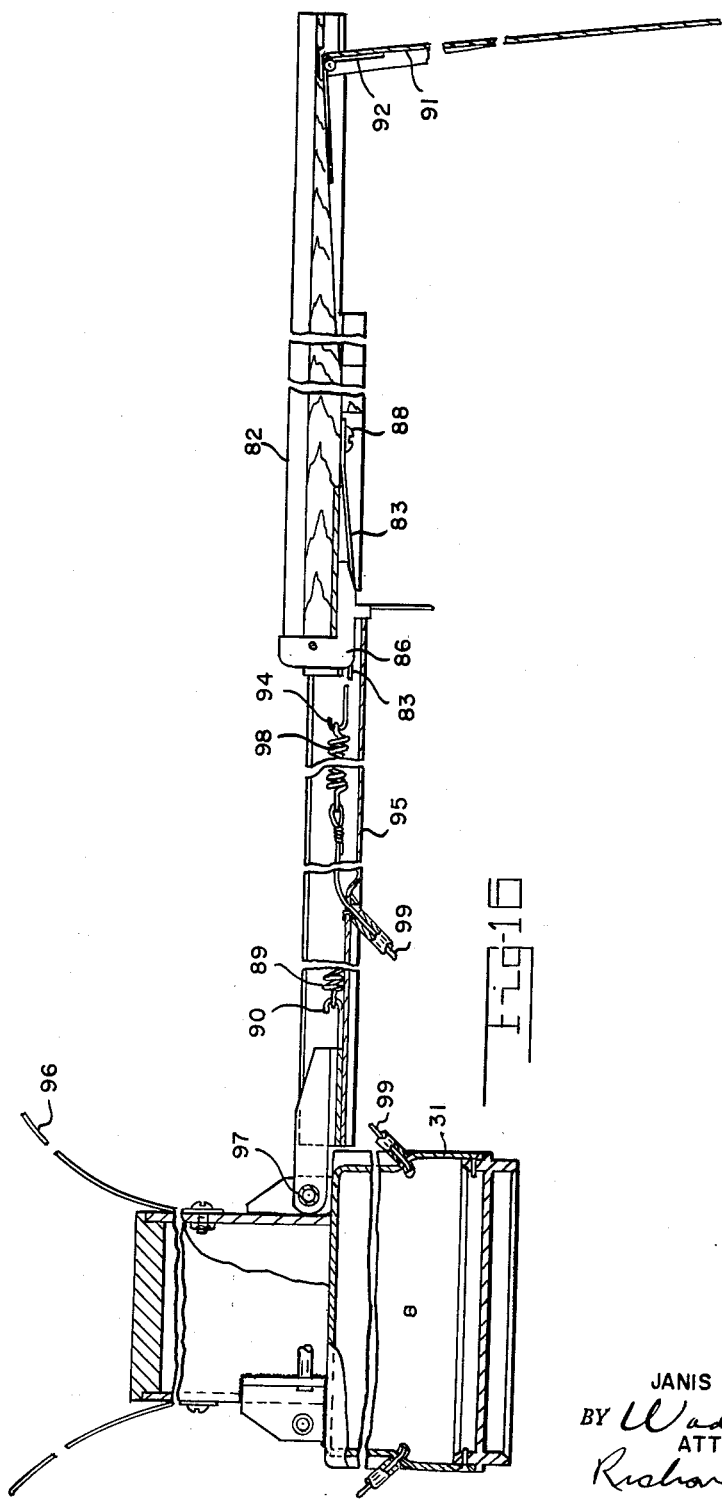

The legs consist of an inner leg 82 made of balsa wood to provide stability for the beacon in water and which is painted with conductive paint to provide a ground plane for R.F. propagation. This leg is operated by means of a cable 83 which passes through a groove 84 and opening 85 in guide member 86 which is shown in Figs. 19 and 20. The cable is attached to the inner leg by means of a screw 88 and to a spring 89, which, in turn, is held by means of a hook 90 located within the outer leg as shown in Fig. 17.

A standing leg 91 is secured to the outer end of leg 82 and is operated by means of a spring 92.

The inner leg 82, and the standing leg 91, are folded inside outer leg 95 when the beacon is in its folded condition. A flat spring 96 located adjacent the transmitter container 32 provides the starting force for opening the leg. The outer leg is pivoted at 97. A spring 98 is located in the outer leg and is connected by means of cable 99 to the battery container 31 and to the outer leg by means of hook 94. This spring provides enough force to lift the beacon to an erect position. The springs 89 and 98 are strong enough to hold the beacon erect; however, if desired the inner or outer legs may be provided with locking means such as a pin which drops into a slot when the leg is in its fully extended position.

As shown in Fig. 15, the antenna consists of a stationary section 100, three folded sections 101, 102 and 103 made of aluminum sheeting and a top section 104 made of steel tape.

Figure 21:
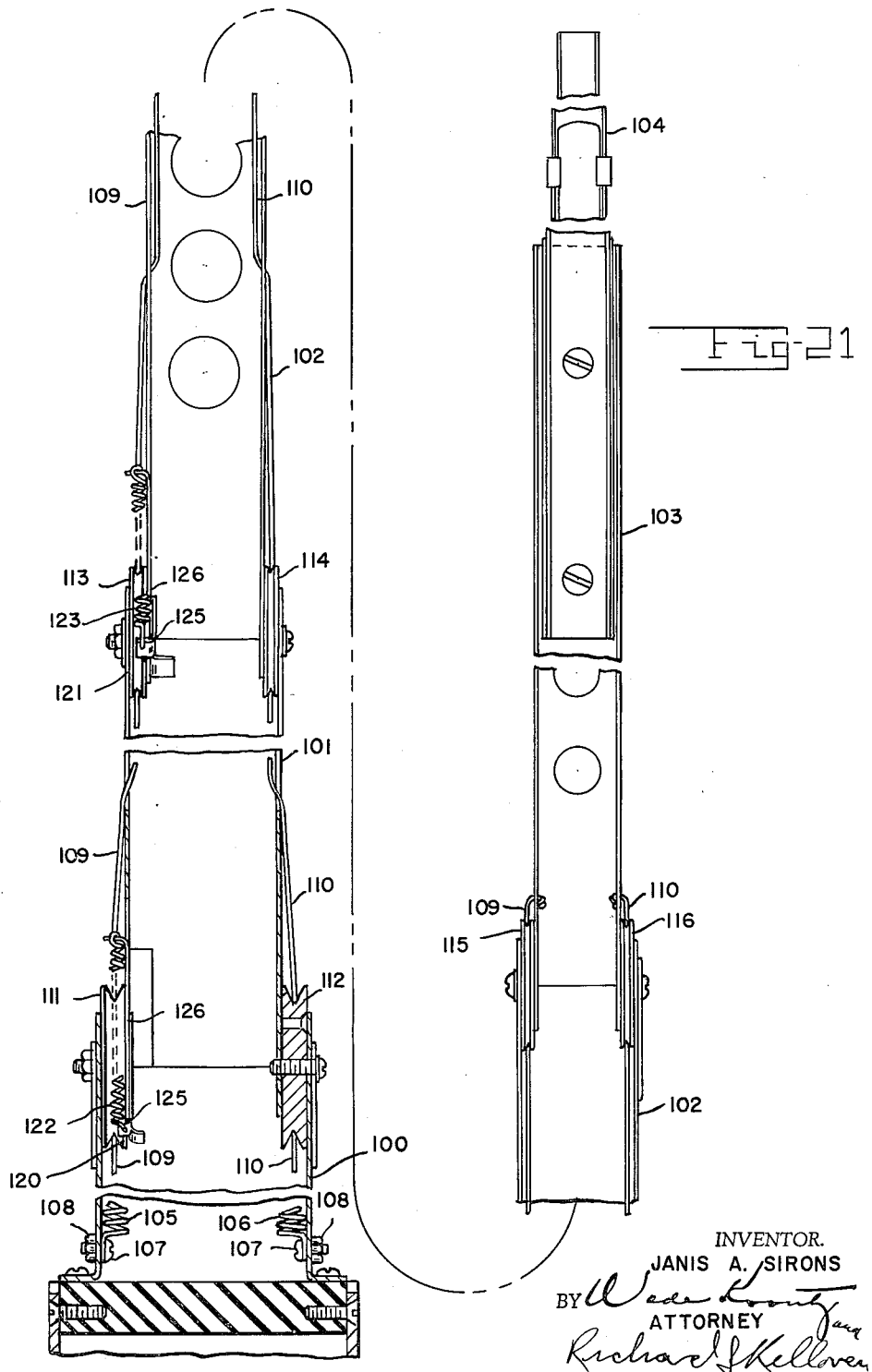
Fig. 21 is a contracted front view, of the antenna, shown partially in section.

The top section of the antenna is folded into the section 103 and opens by its own spring action. Sections 101, 102 and 103 are opened by means of two springs 105 and 106, shown in Figs. 21 and 22, which are secured to the stationary section 100 by means of bolts 107 and nuts 108. The other end of the spring is attached to cables 109 and 110 which pass over pulleys 111, 113, 115, 112, 114 and 116, respectively. The antenna sections are locked in their extended position by means of locking means 120 and 121. Springs 122 and 123 pull edge 125 into engagement with notch 126 to thereby lock the antenna against folding. The position of hole 130 with respect to pulley 115 acts to keep section 103 from bending. The top section 104 is made of spring steel to permit bending of this portion of the antenna and thus reduce wind resistance.

In the operation of the beacon the switches 70 in Fig. 12 are closed when the shock absorber 33 in Fig. 1 is crushed. This closes the circuit through relay winding $R_1$, thus closing contacts 71. This allows current to flow through relay $R_2$, thus opening contacts 74. The current flowing through relay $R_2$ also flows through the fusible release heater winding 72 and fusible release 73. After about 8 milliseconds the leg release 62 operates which allows the disk 58 in Fig. 2 to rotate until the flange 56 on plunger 41 is aligned with opening 51 shown in Fig. 6. In its retracted position plunger 41 releases leg retaining elements 40 so that flat spring elements 96 start opening the legs 35, 36, 37 and 38. When the legs are partially opened, springs 89 and 98 operate to pull the legs the rest of the way open. Spring 98 tends to open the outer leg by means of a cable 99 which is attached to the battery container 31. The spring 89 is attached to a cable 83 which is pulled around guide member 86, thus opening the inner leg 82. As soon as the standing leg 91 is free to open, spring member 92 acts to open the standing legs. Springs 89 and 98 have sufficient strength to retain the legs in their extended position. When the leg release 73 separates the circuit through relay $R_2$ is broken and relay 74 closes its contacts. This then closes the circuit through battery $E_1$, contacts 71, contacts 74, antenna release heater winding 75, and antenna release 76, through the antenna network 80 back to the negative terminal of the power supply $E_1$. After about 8 seconds, which is sufficient time for the leg operating mechanism to fully extend the legs, the release 65 shown in Fig. 13, which includes the release heater winding 75 and the release 76, opens thus permitting the antenna to be extended to its full length as shown in Fig. 15. A cable 109 and a cable 110 are wound around pulley members 111, 113, 115 and 112, 114, and 116 respectively. When the release 65 operates, the springs 105 and 106 pull on these cables which tend to open the sections of the antenna shown in Figs. 15 and 22. When the antenna is fully extended, the springs 122 and 123 pull the locking means 120 and 121 into position so that the edges 125 come into engagement with the notches 126. This holds the antenna in its extended position. The upper element 104 is made of spring steel and opens by its own spring action as can be seen in Fig. 15. Opening of release 76 disconnects the power supply $E_1$ from the antenna coupling network 80. The beacon is now ready to operate and transmit its signals.

There is thus provided a crash locator beacon which is light but rugged in construction and which has good reliability and simplicity of operation.

While one specific embodiment has been described in some detail, it is obvious that numerous changes may be made without departing from the general principles and scope of the invention.

I claim:

1. A light weight crash locator beacon, comprising: a battery; a container for said battery; a transmitter; a container for said transmitter; a foldable antenna attached to said transmitter container; said foldable antenna having a plurality of sections; a fusible release for holding said antenna in its folded condition; means for extending said antenna to its extended position when said fusible release is operated; means for locking said antenna in its extended position; a plurality of legs attached to said transmitter container for supporting said beacon during operation; said legs each having a metal portion and a metal coated wood portion; a mechanical leg release mechanism for holding said legs in their folded condition; a leg retaining element on each of said legs; means on said mechanical leg release mechanism for holding said leg retaining members until said mechanical leg release mechanism is operated; a fusible release connected to said mechanical leg release mechanism for keeping said mechanical leg release mechanism from operating until said fusible release mechanism has been severed; a crushable housing attached to said battery housing; means within said crushable housing for closing the circuit through said leg fusible release mechanism and for opening the circuit through said antenna fusible release mechanism when the crushable housing is crushed; said means for opening the circuit through said antenna fusible release mechanism being responsive to current flow through said leg fusible release mechanism to keep the circuit through said antenna fusible release open until the circuit is broken through said leg fusible release; said leg fusible release being connected in the leg fusible release circuit whereby the circuit is broken when the leg fusible release operates; said leg fusible release having a delay time period sufficient to permit the legs of said crash locator beacon to become fully extended before the antenna release mechanism operates.

2. A light weight crash locator beacon, comprising: a battery; a container for said battery; a transmitter; a container for said transmitter; a foldable antenna attached to said transmitter container; said foldable antenna having a plurality of sections; a fusible release for holding said antenna in its folded condition; means for extending said antenna to its extended position when said fusible release is operated; means for locking said antenna in its extended position; a plurality of legs attached to said transmitter container for supporting said beacon during operation; each of said legs having an inner leg, an outer leg and a standing leg and said inner leg being folded within said outer leg when said beacon is in its closed condition; a mechanical leg release mechanism for holding said legs in their folded condition; a leg retaining element on each of said legs; means on said mechanical leg release mechanism for holding said leg retaining members until said mechanical leg release mechanism is operated; a fusible release connected to said mechanical leg release mechanism for keeping said mechanical leg release mechanism from operating until said fusible release mechanism has been severed; a crushable housing attached to said battery housing; means within said crushable housing for closing the circuit through said leg fusible release mechanism and for opening the circuit through said antenna fusible release mechanism when the crushable housing is crushed; said means for opening the circuit through said antenna fusible release mechanism being responsive to current flow through said leg fusible release mechanism to keep the circuit through said antenna fusible release open until the circuit is broken through said leg fusible release; said leg fusible release being connected in the leg fusible release circuit whereby the circuit is broken when the leg fusible release operates; said leg fusible release having a delay time period sufficient to permit the legs of said crash locator beacon to become fully extended before the antenna release mechanism operates.

3. A light weight crash locator beacon, comprising: a battery; a container for said battery; a transmitter; a container for said transmitter; a foldable antenna attached to said transmitter container; said foldable antenna having a plurality of sections; a fusible release for holding said antenna in its folded condition; a pair of pulleys connected to the lower end of all but the top section of said antenna; a pair of springs; a cable connected to each of said springs; said cables being wrapped around said pulleys, whereby they tend to extend the antenna when said fusible release is operated; means adjacent said pulleys for locking said antenna in its extended position; a plurality of legs attached to said transmitter container for supporting said beacon during operation; each of said legs having an inner leg, an outer leg and a standing leg; said inner leg being folded within said outer leg when said beacon is in its closed condition; means located within said legs for opening said legs; a mechanical leg release mechanism for holding said legs in their folded condition; said release mechanism having a body member, said body member having a slot with a greater dimension in one direction than in the other direction; a plunger, said plunger element having a flange and locking projection thereon with the shape of said flange being substantially the same as that of said slot; releasable means for holding the flange on said plunger element out of alignment with said slot when said plunger is in its locked position; means for moving said flange into alignment with said slot when said holding means is released and for moving said plunger from its locked position to its release position when the flange on said plunger aligns with the slot on said body member; a leg retaining element, having an opening therein, on each of said legs; said projection on said plunger extending into said openings when the plunger is in its locked position; a fusible release connected to said mechanical leg release mechanism for keeping said mechanical leg release mechanism from operating until said fusible release mechanism has been severed; a crushable housing attached to said battery housing; means within said crushable housing for closing the circuit through said leg fusible release mechanism and for opening the circuit through said antenna fusible release mechanism when the crushable housing is crushed; said means for opening the circuit through said antenna fusible release mechanism being responsive to current flow through said leg fusible release mechanism to keep the circuit through said antenna fusible release open until the circuit is broken through said leg fusible release; said leg fusible release being connected in the leg fusible release circuit whereby the circuit is broken when the leg fusible release operates; said leg fusible release having a delay time period sufficient to permit the legs of said crash locator beacon to become fully extended before the antenna release mechanism operates.

4. A light weight crash locator beacon, comprising: a battery; a container for said battery; a transmitter; a container for said transmitter; a foldable antenna attached to said transmitter container; said foldable antenna having a plurality of sections; a fusible release for holding said antenna in its folded condition; a pair of pulleys connected to the lower end of all but the top section of said antenna; a pair of springs; a cable connected to each of said springs; said cables being wrapped around said pulleys, whereby they tend to extend the antenna when said fusible release is operated; means adjacent said pulleys for locking said antenna in its extended position; a plurality of legs attached to said transmitter container for supporting said beacon during operation; each of said legs having an inner leg, an outer leg and a standing leg and said inner leg being folded within said outer leg when said beacon is in its closed condition; means adjacent said transmitter housing for urging said legs away from said transmitter housing; means located within said legs for opening said legs and for erecting said crash locator beacon; a mechanical leg release mechanism for holding said legs in their folded condition; said release mechanism having a body member, said body member having a slot with a greater dimension in one direction than in the other direction; a plunger, said plunger element having a flange and locking projection thereon with the shape of said flange being substantially the same as that of said slot; releasable means for holding the flange on said plunger element out of alignment with said slot when said plunger is in its locked position; means for moving said flange into alignment with said slot when said holding means is released and for moving said plunger from its locked position to its release position when the flange on said plunger aligns with the slot on said body member; a leg retaining element on each of said legs; each of said leg retaining elements having an opening therein; said projection on said plunger extending into said openings when the plunger is in its locked position; a fusible release connected to said mechanical leg release mechanism for keeping said mechanical leg release mechanism from operating until said fusible release mechanism has been severed; a crushable housing attached to said battery housing; means within said crushable housing for closing the circuit through said leg fusible release mechanism and for opening the circuit through said antenna fusible release mechanism when the crushable housing is crushed;

said means for opening the circuit through said antenna fusible release mechanism being responsive to current flow through said leg fusible release mechanism to keep the circuit through said antenna fusible release open until the circuit is broken through said leg fusible release; said leg fusible release being connected in the leg fusible release circuit whereby the circuit is broken when the leg fusible release operates; said leg fusible release having a delay time period sufficient to permit the legs of said crash locator beacon to become fully extended before the antenna release mechanism operates.

5. A release mechanism for a crash locator beacon, comprising: a body member, said body member having a slot with a greater dimension in one direction than in the other direction; a plunger, said plunger element having a flange and locking projection thereon with the shape of said flange being substantially the same as that of said slot; releasable means for holding the flange on said plunger element out of alignment with said slot when said plunger is in its locked position; means for moving said flange into alignment with said slot when said holding means is released and for moving said plunger from its locked position to its release position when the flange on said plunger aligns with the slot on said body member.

6. A release mechanism for a crash locator beacon, comprising: a body member, said body member having a slot with a greater dimension in one direction than in the other direction; a plunger, said plunger having a flange and projection thereon with the shape of said flange being substantially the same as that of said slot; a fusible release for holding the flange on said plunger element out of alignment with said slot when said plunger is in its locked position; means for moving said flange into alignment with said slot when said fusible release is separated and for moving said plunger from its locked position to its release position when the flange on said plunger aligns with the slot on said body member; means for moving said flange to alignment with the opening of said body member when said plunger is to be removed to its release position.

7. A light weight crash locator beacon, comprising: a battery; a container for said battery; a transmitter; a container for said transmitter; a foldable antenna attached to said transmitter container; said foldable antenna having a plurality of sections; a fusible release for holding said antenna in its folded condition; a pair of pulleys connected to the lower end of all but the top section of said antenna; a pair of springs; a cable connected to each of said springs; said cables being wrapped around said pulleys, whereby they tend to extend the antenna when said fusible release is operated; means adjacent said pulleys for locking said antenna in its extended position; a plurality of legs attached to said transmitter container for supporting said beacon during operation; each of said legs having an inner leg made of balsa wood with a coating of metal thereon, an outer leg and a standing leg; said inner leg being folded within said outer leg when said beacon is in its closed condition; means adjacent said transmitter housing for urging said legs away from said transmitter housing; means located within said legs for opening said legs and for erecting said crash locator beacon; a mechanical leg release mechanism for holding said legs in their folded condition; said release mechanism having a body member, said body member having a slot with a greater dimension in one direction than in the other direction; a plunger, said plunger element having a flange and locking projection thereon with the shape of said flange being substantially the same as that of said slot; releasable means for holding the flange on said plunger element out of alignment with said slot when said plunger is in its locked position; means for moving said flange into alignment with said slot when said holding means is released and for moving said plunger from its locked position to its release position when the flange on said plunger aligns with the slot on said body member; a leg retaining element on each of said legs; each of said leg retaining elements having an opening therein; said projection on said plunger extending into said openings when the plunger is in its locked position; a fusible release connected to said mechanical leg release mechanism for keeping said mechanical leg release mechanism from operating until said fusible release mechanism has been severed; a crushable housing attached to said battery housing; means within said crushable housing for closing the circuit through said leg fusible release mechanism and for opening the circuit through said antenna fusible release mechanism when the crushable housing is crushed; said means for opening the circuit through said antenna fusible release mechanism being responsive to current flow through said leg fusible release mechanism to keep the circuit through said antenna fusible release open until the circuit is broken through said leg fusible release; said leg fusible release being connected in the leg fusible release circuit whereby the circuit is broken when the leg fusible release operates; said leg fusible release having a delay time period sufficient to permit the legs of said crash locator beacon to become fully extended before the antenna release mechanism operates.

8. A circuit for operating an antenna and a leg release on a crash locator beacon, comprising: a first circuit including, a power supply, a first relay winding and a crash responsive switch; a second circuit including said power supply, the normally open contacts of said first relay, a second relay winding, a first fusible release, a heater winding for said first fusible release whereby said second circuit is opened when said release operates; a third circuit including said power supply, the antenna network for said crash locator beacon, the normally closed contacts of said second relay which are opened in response to current flow in said second circuit; a second fusible release and a heater winding for said second fusible release whereby the circuit through said antenna network and power supply is broken when said second fusible release operates; said fusible releases having a predetermined delay time built therein.

References Cited in the file of this patent
UNITED STATES PATENTS

| | | |
|---|---|---|
| 2,239,125 | Summers | Apr. 22, 1941 |
| 2,555,352 | Lowell et al. | June 5, 1951 |
| 2,555,867 | Bennett | June 5, 1951 |
| 2,586,828 | Keeran | Feb. 26, 1952 |
| 2,762,884 | Van Eyk | Sept. 11, 1956 |